United States Patent [19]
Tucker

[11] Patent Number: 5,959,526
[45] Date of Patent: Sep. 28, 1999

[54] MILKING PARLOR COW IDENTIFICATION CORRECTION METHOD

[75] Inventor: George H. Tucker, Janesville, Wis.

[73] Assignee: DEC International, Inc., Madison, Wis.

[21] Appl. No.: 08/922,083

[22] Filed: Sep. 2, 1997

[51] Int. Cl.[6] .................................................. G08B 13/14
[52] U.S. Cl. .................................. 340/372.1; 340/573.3; 340/825.15; 340/825.16; 340/825.34; 119/51.02; 119/14.17; 119/14.03; 119/14.14; 235/375; 235/425; 377/54; 377/69
[58] Field of Search ..................................... 340/573, 572, 340/825.15, 825.55, 825.16, 825.3, 825.54, 825.34; 119/51.02, 14.17, 174, 14.03, 14.14; 371/72; 235/375, 380, 382, 385, 424, 425, 431; 377/22, 23, 29, 54, 69; 209/1, 2

[56] References Cited

U.S. PATENT DOCUMENTS

| | | | |
|---|---|---|---|
| 4,114,151 | 9/1978 | Denne et al. | 342/44 |
| 4,247,758 | 1/1981 | Rodrian | 377/6 |
| 4,274,083 | 6/1981 | Tomeda | 340/825.72 |
| 4,463,353 | 7/1984 | Kuzara | 340/825.54 |
| 4,517,923 | 5/1985 | Palmer | 119/51.02 |
| 4,548,161 | 10/1985 | Reisgies et al. | 119/14.17 |
| 4,618,861 | 10/1986 | Gettens et al. | 340/825.54 |
| 4,798,175 | 1/1989 | Townsend et al. | 340/572 |
| 5,028,918 | 7/1991 | Giles et al. | 340/825.54 |
| 5,183,008 | 2/1993 | Carrano | 119/840 |
| 5,203,280 | 4/1993 | Nelson | 119/14.03 |
| 5,322,034 | 6/1994 | Willham et al. | 119/174 |

Primary Examiner—Benjamin C. Lee
Attorney, Agent, or Firm—Andrus, Sceales, Starke & Sawall

[57] ABSTRACT

In a milking parlor having a plurality of stalls for simultaneously milking a plurality of cows, and an identification station for identifying cows passing serially therethrough, an identification correction method compares produced milk weight values and expected milk weight values in a given milking, and performs a correction by shifting at least one or more of the expected milk weight values relative to the produced milk weight values by at least one stall number, to provide accurate cow identification when there is a misidentified or nonidentified cow, such as a cow having a missing identification tag.

32 Claims, 6 Drawing Sheets

MILKING PARLOR COW IDENTIFICATION CORRECTION METHOD

BACKGROUND AND SUMMARY

The invention relates to automated milking parlors, and more particularly to a method for correcting improperly identified cows which may have a lost or malfunctioning identification tag, or otherwise are misidentified.

Milking parlors with automatic cow identification systems are known in the prior art, for example as disclosed in U.S. Pat. Nos. 5,028,918, 5,183,008, incorporated herein by reference. The parlor typically has an identification sensor at the entrance and/or exit, which sensor includes a transmitter antenna and a receiver antenna for communicating with a transponder in an identification tag on a collar around the neck of the cow. The transponder in the identification tag includes an electronic oscillator circuit triggered by interrogating electromagnetic RF radiation from the transmitter antenna and sending back a coded identifying signal in response to the interrogating pulse, which signal is received by the receiver antenna. The coded identifying signal is an individual unique identification code identifying that particular cow.

The cows initially enter the parlor at a small holding pen, and then pass serially through an entrance having the noted identification antenna system, and then into plural parallel milking stalls, with the first cow entering stall number 1, the second cow entering stall number 2, and so on. The identification system correlates the cow passing through the antenna system with the stall receiving such cow. In this manner, it is known which cow is in which stall, and in turn milk production can be correlated and tracked for each cow.

A problem arises if a cow passing through the entrance antenna system has lost her tag or has a malfunctioning tag, in which case there is no coded response signal sent back to the receiver antenna and hence no cow identified. The respective stall thus has an unidentified cow therein, and the computerized tracking system will think that the next trailing cow is in such stall location. For example, if the fifth cow to pass serially through the entrance has a missing tag, such fifth cow will in turn pass into stall location number 5. However, the computerized identification system will not register a fifth response coded signal until the sixth cow, and hence will correlate the sixth cow to stall location number 5, i.e. the computer does not see or register or identify cow number 5, and instead identifies the sixth cow as cow number 5 and thinks that such sixth cow is in stall number 5. Likewise, all succeeding cows will be misidentified by one stall location, i.e. improperly correlated to the wrong stall.

In small dairies, the above problem is not a significant drawback because the milking personnel know the cows and can correct missed identifications. However, in large parlors, a misidentification can become a significant problem, particularly when the milkers do not know the cows well enough to correct errors. In addition to absent or malfunctioning tags, misidentifications may be caused when a cow enters with her tag in an unreadable position, electronic noise interference, and so on. Even if the error or misidentification rate is low, e.g. less than one percent, a significant problem can arise depending upon where such error occurs in the serial flow of cows through the entrance. For example, if one of the last cows serially entering the parlor has a missing tag, then only the few cows thereafter will also be misidentified. However, if one of the first cows serially entering the parlor has a missing tag, then each of the cows thereafter will be correlated to the wrong stall number. Furthermore, if a second cow has a missing tag, then further cows after such second cow will be miscorrelated by two stall locations.

The present invention addresses and solves the noted misidentification problem in a simple and effective manner.

DETAILED DESCRIPTION OF THE INVENTION

Figure 1:
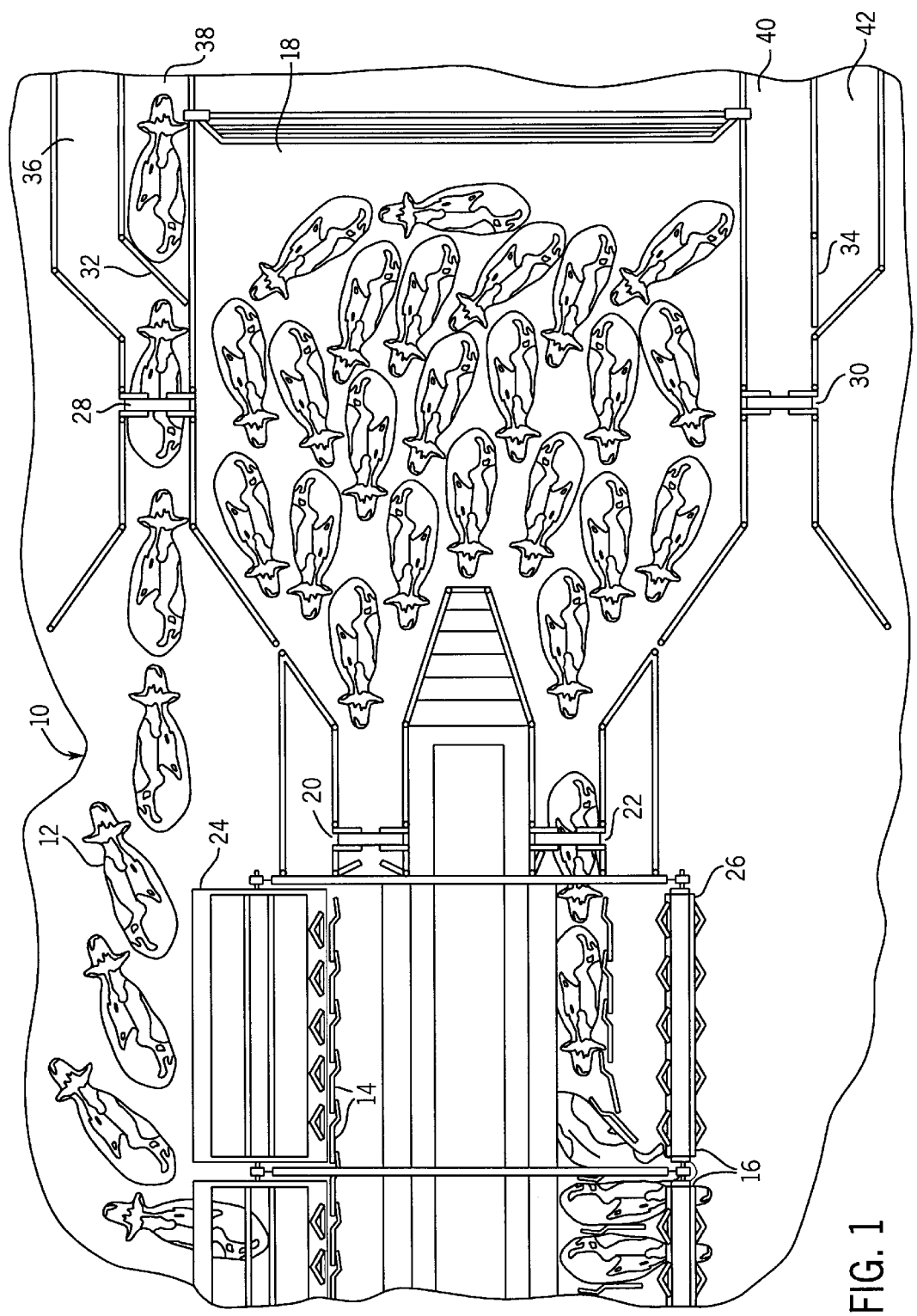
FIG. 1 is a top plan view of a portion of a plural stall milking parlor.

FIG. 1 shows a milking parlor 10 for milking a plurality of cows 12. A double parlor is shown, including a first bank of parallel milking stalls 14, and a second bank of parallel milking stalls 16. The cows initially enter the parlor at holding pen 18, and then pass serially through identification station 20 or 22. The identification station includes a frame, such as shown at frame 12 in incorporated U.S. Pat. No. 5,183,008, having a transmitter antenna, such as shown at 13 in the '008 patent, and a receiver antenna, such as shown at 14 in the '008 patent, for identifying a cow passing through such entry identification station. The cow has a collar, such as shown at 16 in the '008 patent, carrying an identification tag, such as 17 in the '008 patent, including an electronic oscillator circuit triggered by interrogating electromagnetic RF radiation from the transmitter antenna and sending back a coded identifying signal in response to the interrogating pulse, which coded signal is received by the receiver antenna, for example as further disclosed in incorporated U.S. Pat. No. 5,028,918. After the cows pass serially through the entrance identification station 20, 22, they enter stalls 14, 16 in parallel, and are milked. Upon completion of milking, exit gate reels 24, 26 rotate as shown in U.S. Pat. No. 5,203,280, incorporated herein by reference, permitting exit of the cows, for example as shown at rotated exit reel 20 in FIG. 2 of the incorporated '280 patent. The cows then exit serially through exit stations 28, 30, which also have an identification sensor, including a transmitter antenna and a receiver antenna, for performing a sort function by actuating an exit gate, for example as shown at exit gate 52 in the incorporated '008 patent, between a first position as shown at 32 and a second position as shown at 34, for directing the cows through respective aisles 36, 38, 40, 42, in accordance with desired sort functions.

Upon completion of milking, the weight of the milk produced by each cow is recorded. The produced milk weight values of respective cows are tracked, and from such history, expected milk weight values are established, all as is well known. In the present invention, in a given milking, produced milk weight values are compared against expected milk weight values, and a correction is performed in response to a given comparative condition therebetween. The correction is preferably performed when the number of produced milk weight values exceeds the number of expected milk weight values. This is a sign that one or more of the cows has a missing identification transponder tag, a malfunctioning tag, or is otherwise somehow misidentified or nonidentified. The correction is performed by shifting at least one or more of the expected milk weight values relative to produced milk weight values by at least one stall number to more accurately match produced milk weight values and expected milk weight values, to provide more accurate cow identification. In preferred form, produced milk weight values and expected milk weight values are charted in a graph of stall number versus milk weight, and the correction is performed by shifting at least one or more of the expected milk weight values along the axis of the stall number in the graph, to be described.

Figure 2:
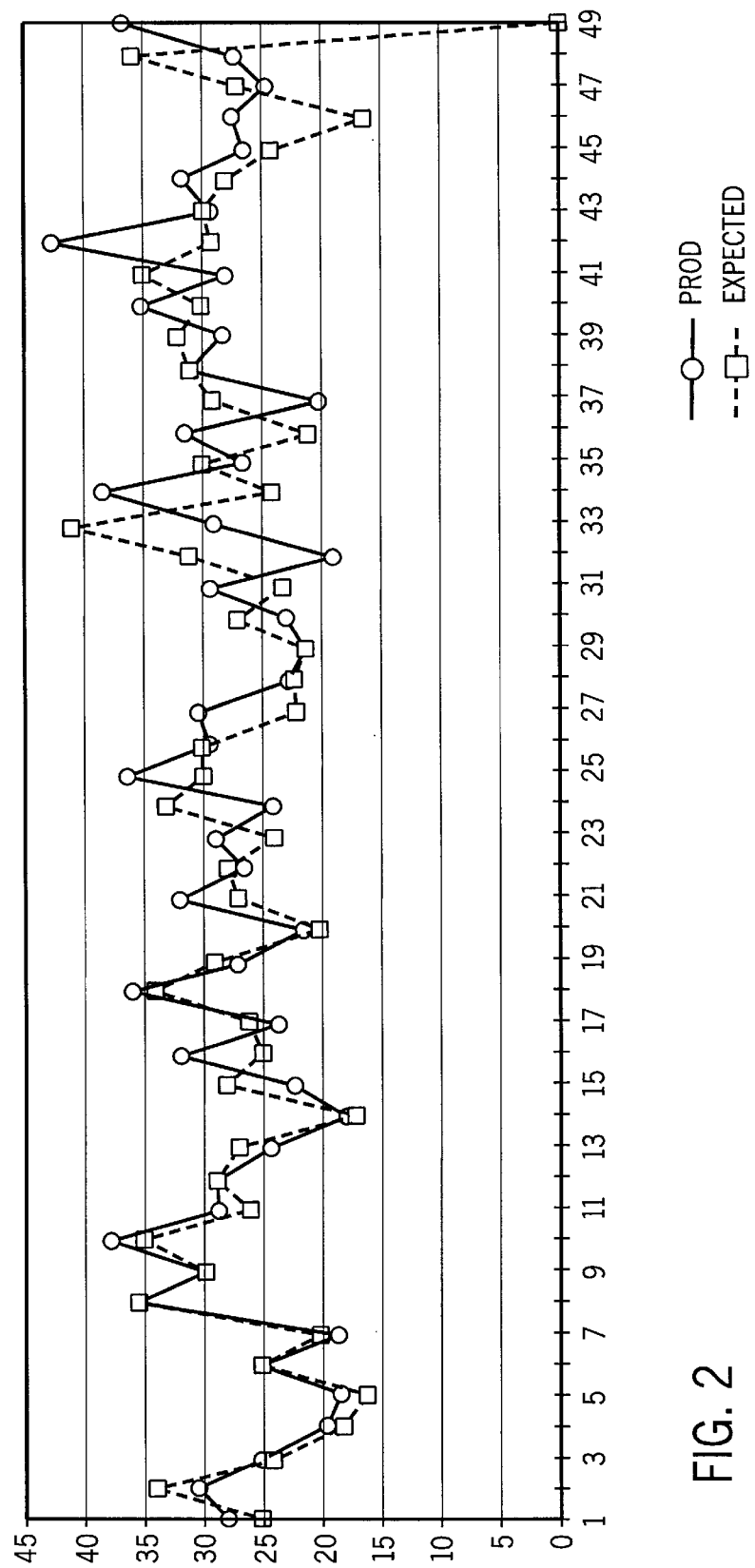
FIG. 2 is a graph of milk weight versus stall location number, showing uncorrected milk weight data.
Figure 3:
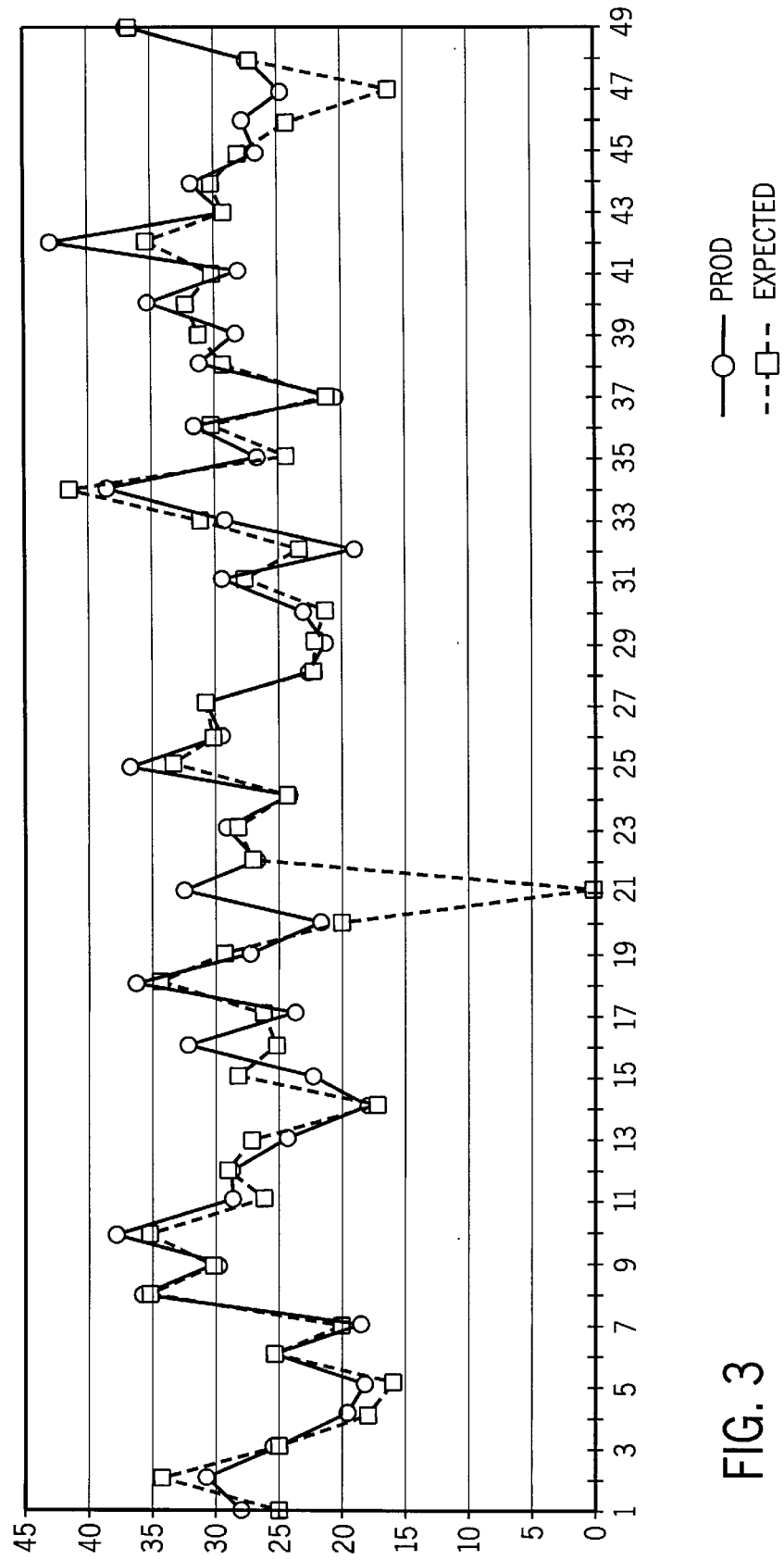
FIG. 3 is a graph like FIG. 2, but showing corrected milk weight data in accordance with the invention.

FIG. 2 shows a graph of milk weight value in pounds on the vertical axis versus stall number or location on the horizontal axis. The graph includes the data points for both produced milk weight values and expected milk weight values as shown. As seen in the graph, there are 49 produced milk weight values, and only 48 expected milk weight values. On the left portion of the graph, the lines connecting the data points match up well, but there is a mismatch on the right portion of the graph. The present method compares expected and produced milk weight values at adjacent stalls for each cow, and inserts a special marker or phantom cow at a stall, and repeats such procedure for each cow, to determine the misidentified cow, i.e. which stall number has the cow with the missing tag or otherwise unidentified cow, to be described. In FIG. 2, it is determined that the cow with the missing tag is in stall number 21, to be described. Accordingly, the expected milk weight values for the higher numbered stalls to the right thereof are shifted one stall number to the right, to match up with produced milk weight values for respective stalls. This is shown in FIG. 3. Because the cow at stall 21 is unidentified and not known, it has zero expected milk weight value, and the graph in FIG. 3 shows a dip to zero. The lines connecting the data points match up much better in the right portion of FIG. 3 than in FIG. 2.

Figure 4:
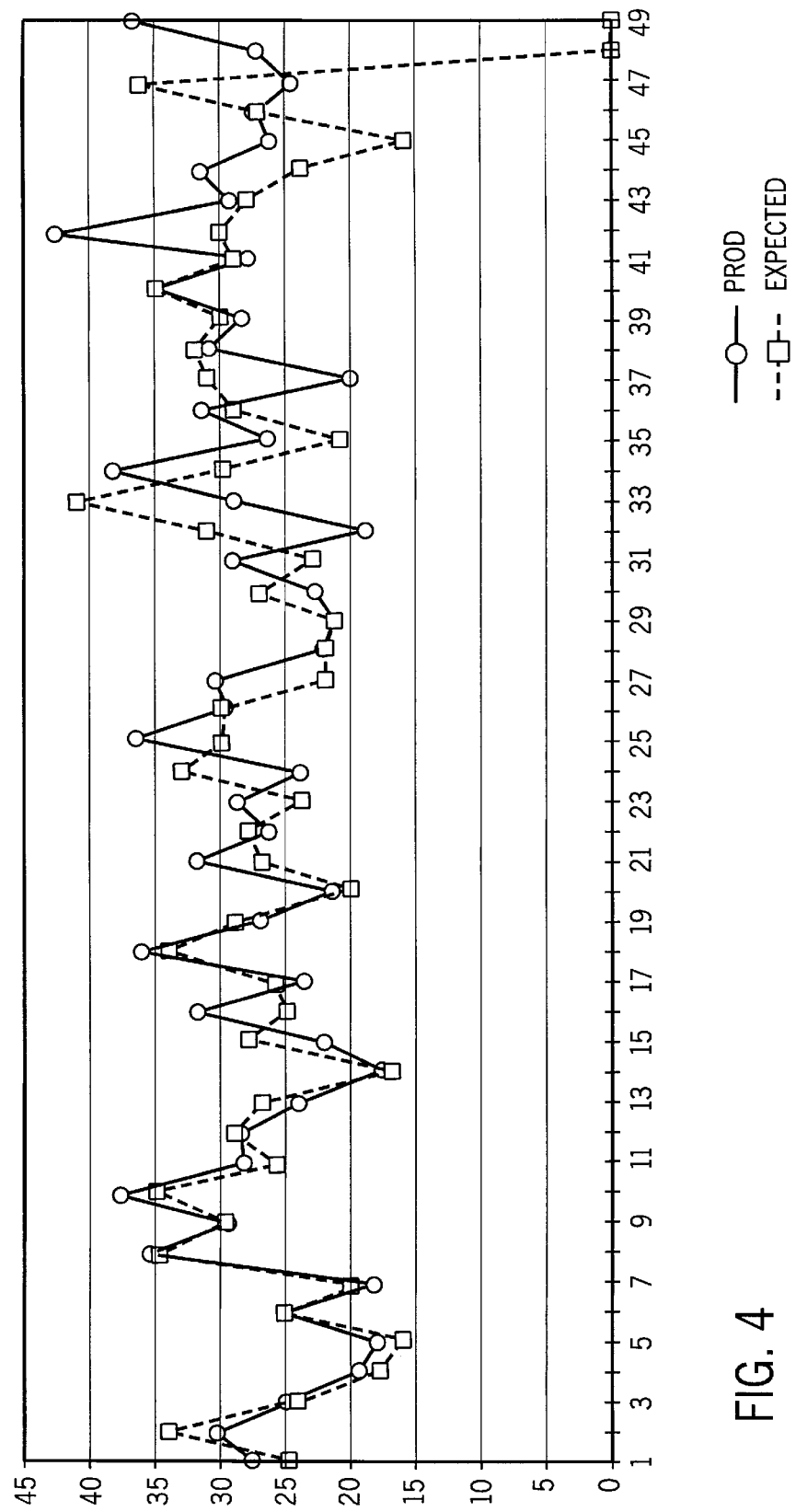
FIG. 4 is a graph like FIG. 2, but showing uncorrected milk weight data with two missing cow identification tags.
Figure 5:
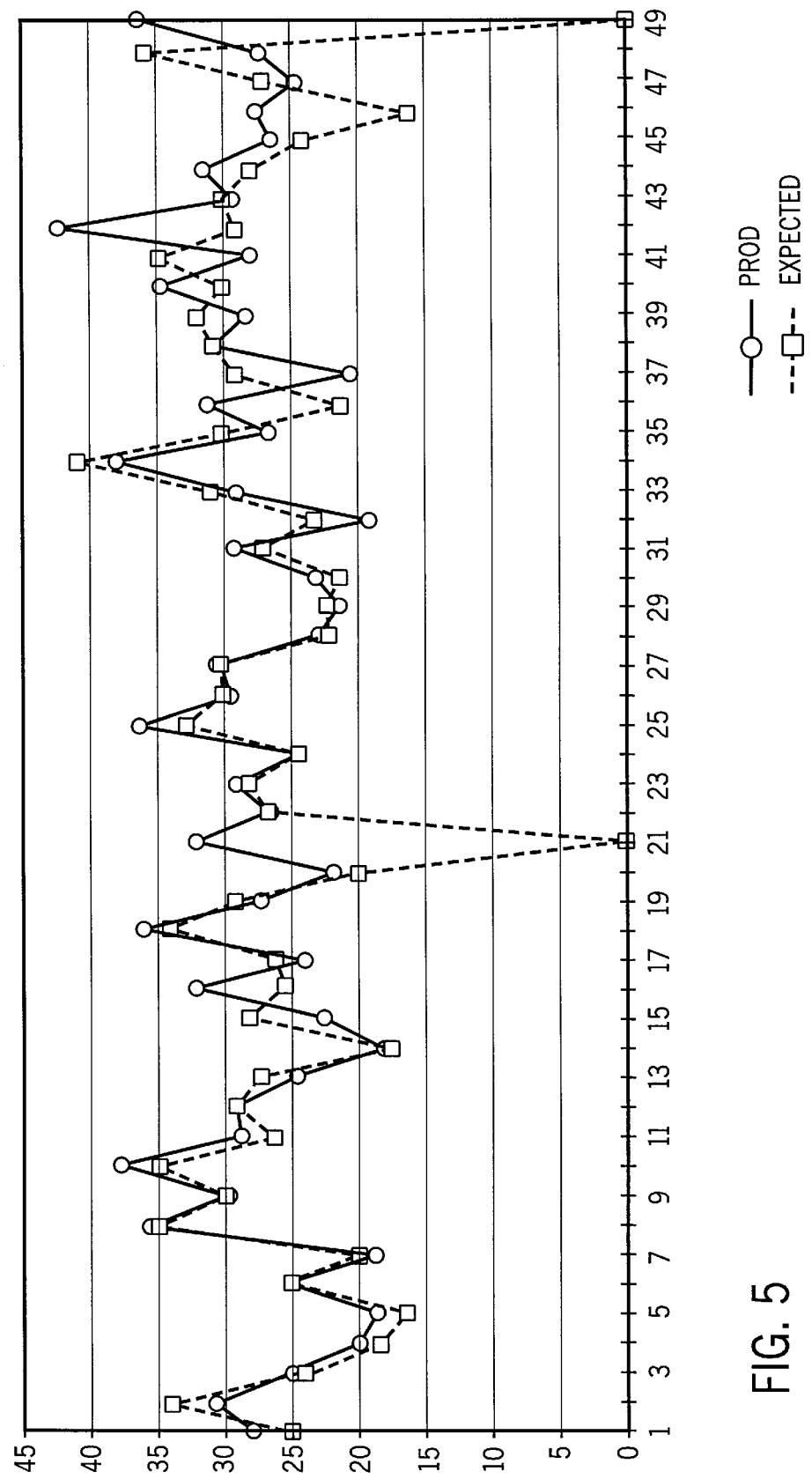
FIG. 5 is like FIG. 4, but showing corrected milk weight data for one of the missing tags.
Figure 6:
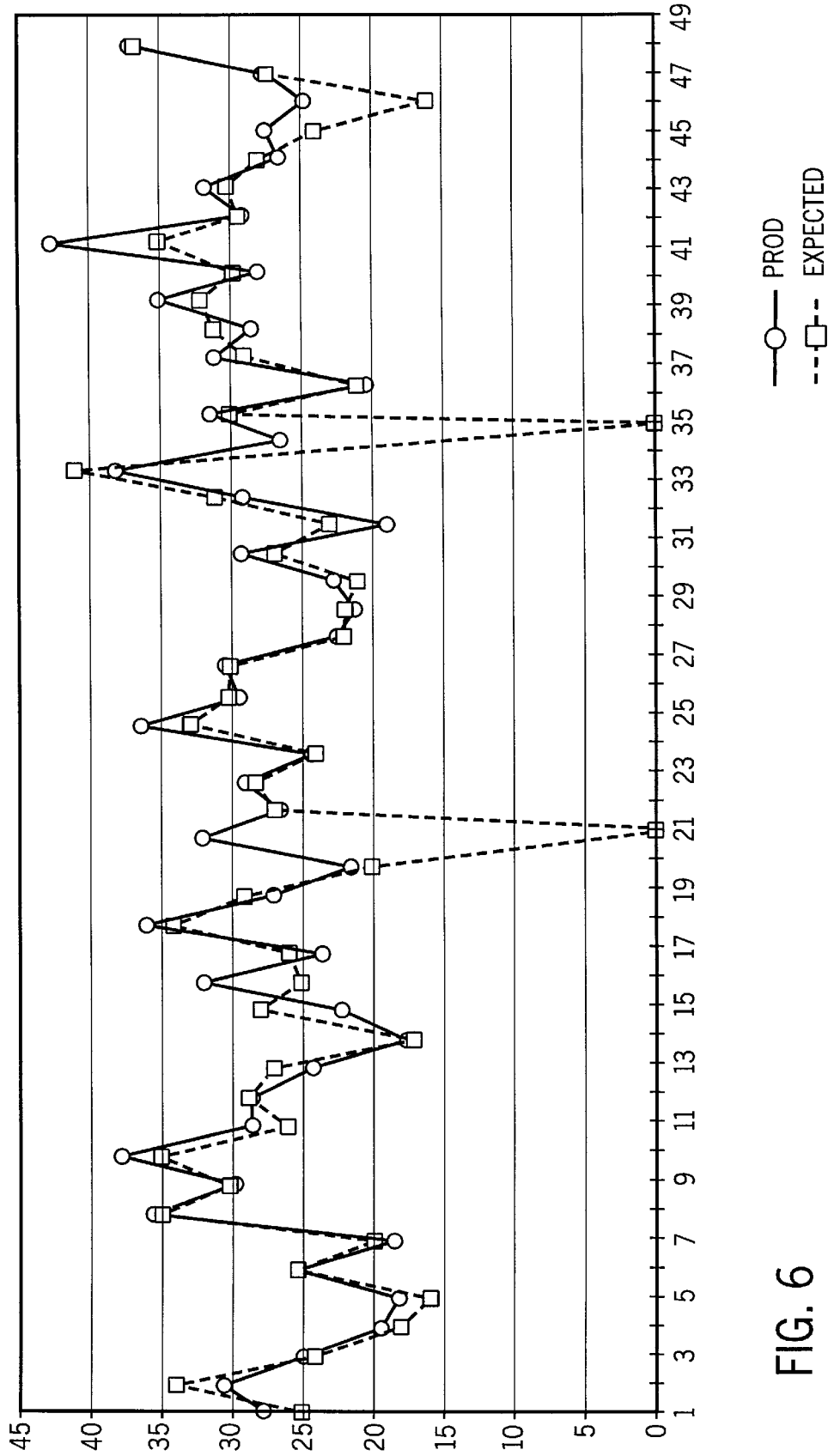
FIG. 6 is like FIG. 5, but showing corrected milk weight data for both missing tags.

The above described method also works if more than one cow has a missing identification tag, if the number of such cows with missing tags is small. FIG. 4 shows uncorrected milk weight data, with two cows having missing identification tags. The left side of the graph in FIG. 4 is a good match between expected milk weight value and produced milk weight value, but the middle and right portions do not match. In accordance with the above method, a marker or dummy cow is inserted at stall 21, and the expected milk weight value data points are shifted one stall number to the right thereof, to yield the graph in FIG. 5 which is corrected for one of the missing tags. The data matches well up until stall number 35, after which there is a mismatch. A second marker dummy cow is inserted at stall 35, and the remaining expected milk weight values are further shifted one stall number to the right, to yield the graph in FIG. 6 which is corrected for both missing tags.

In accordance with the noted method, a possible misidentified or nonidentified cow is assumed in a given stall number. The expected milk weight value otherwise expected for such given stall number is shifted to the next stall number. Likewise, expected milk weight values for further stall numbers are shifted to the next incremented stall number, respectively. The above method is performed when the number of produced milk weight values exceeds the number of expected milk weight values by one. When the number of produced milk weight values exceeds the number of expected milk weight values by two, then a possible second misidentified or nonidentified cow is assumed in a second given stall number. The expected milk weight value otherwise expected for such second stall number is shifted to the next stall number. Likewise, the shifted expected milk weight values for further stall numbers are further shifted to the next further stall number, respectively.

In a given milking, identified cows are correlated to respective stall numbers, and produced milk weight values are compared against expected milk weight values. The correction is performed by shifting expected milk weight values relative to produced milk weight values by at least one stall number to account for an unidentified cow, and properly correlate expected milk weight value to produced milk weight value and accurately identify the cow producing same. At least one or more of the expected milk weight values are shifted by one stall number. In the case of two missing tags, a first group of one or more expected milk weight values are shifted by one stall number, and a second group of one or more expected milk weight values are shifted by two stall numbers.

The method for determining the stall number of the cow with the missing tag, or the otherwise nonidentified or misidentified cow, is described below. Referring to Table I: the first column, Row, is stall number; the second column, Cow, is cow number; the third column, Exp, is expected milk weight value; the fourth column, Prod, is actual produced milk weight value; the fifth column, Err1, is the difference between produced milk weight value and expected milk weight value; the sixth column, Err2, is the difference between produced milk weight value and expected milk weight value of the next stall; the seventh column, Sum1, is the accumulated sum of Err1 values above this stall number; the eighth column, Sum2, is the accumulated sum of Err2 values below this stall number; the ninth column, Total, is the accumulated errors above and below this stall number. The cow number, expected milk weight value, and produced milk weight value are entered into the table as the cows are milked. For purposes of the table, a stall group is a group of milking stalls that are associated with a serial parlor entry identification system, and is assumed to be numbered in order from 1 to P, where stall number 1 is the stall furthest from the parlor entrance. It is further assumed that cows assigned to or correlated to stalls starting with stall number 1, and that all stalls in the group have a cow in them. Thus, there will always be P produced milk weight values, one for each stall. However, if there are cows that were not identified, there will be no more than P-1 cows. The stall group may be a subset of the actual stalls in the parlor when the number of cows milked is less than the number of stalls in the parlor.

TABLE I

| Row | Cow | Exp | Prod | Err1 | Err2 | Sum1 | Sum2 | Total | |
|---|---|---|---|---|---|---|---|---|---|
| 1 | 7603 | 41.0 | 46.2 | 5.2 | 0.2 | 0 | 42.6 | 42.6 | |
| 2 | 7206 | 41.0 | 41.2 | 0.2 | 3.5 | 5.2 | 42.4 | 47.6 | |
| 3 | 1140 | 36.0 | 37.5 | 1.5 | 7.0 | 5.4 | 38.9 | 44.3 | |
| 4 | 2575 | 37.0 | 43.0 | 6.0 | 10.3 | 6.9 | 31.9 | 38.8 | |
| 5 | 7662 | 41.0 | 47.3 | 6.3 | 9.2 | 12.9 | 2.16 | 34.5 | |
| 6 | 3424 | 34.0 | 31.8 | 2.2 | 1.4 | 19.2 | 12.4 | 31.6 | MinTotal |
| 7 | 7747 | 29.0 | 35.4 | 6.4 | 3.2 | 21.4 | 11.0 | 32.4 | |
| 8 | 1890 | 20.0 | 32.2 | 12.2 | 2.9 | 27.8 | 7.8 | 35.6 | |
| 9 | 6491 | 27.0 | 22.9 | 4.1 | 1.5 | 40.0 | 4.9 | 44.9 | |
| 10 | 6460 | 31.0 | 25.5 | 5.5 | 1.7 | 44.1 | 3.4 | 47.5 | |
| 11 | 7737 | 35.0 | 29.3 | 5.7 | 1.7 | 49.6 | 1.7 | 51.3 | |
| 12 | 0 | 0.0 | 36.7 | 36.7 | 0.0 | 55.3 | 0.0 | 55.3 | |

The identification correction method steps are as follows.

Step 1: Verify that cow tag(s) are missing
  If Cow(P) (the last cow) is not 0 proceed to Step 8
Step 2: Calculate the Err1 and Err2 Values
  For Row equals 1 to P
    Set Err1(Row) equal to the absolute value of Prod (Row) minus Exp(Row)
    If Row is less than P:
      set Err2(Row) equal to the absolute value of Prod (Row+1) minus Exp(Row)
    Else if Row is equal to P, set Err2(Row) equal to 0.
Step 3: Calculate the Accumulated Error Above (Sum1) values
  Set Sum1(1) equal to 0
  For Row equals 2 to P
    Set Sum1(Row) equal to Sum1(Row−1) plus Err1 (Row−1)
Step 4: Calculate the Accumulated Error Below (Sum2) values
  Set Sum2(P) equal to 0
  For Row equals P−1 down to 1:
    Set Sum2(Row) equal to Sum2(Row+1) plus Err2 (Row)
Step 5: Calculate the Total Accumulated Errors(Total)
  For Row equals 1 to P:
    Set Total (Row) equal to Sum1(Row) plus Sum2(Row)
Step 6: Find the smallest Total Error value
  Set Minimum equal to Total(1)
  Set Minimum Row equal to 1
  For Row equals 2 to P:
    If Total(Row) is less than Minimum and Cow(Row) is not equal to 0:
      set Minimum equal to Total(Row)
      set Minimum Row equal to Row
Step 7: Insert a Marker or Dummy Cow at the Minimum point
  If Minimum Row is less than P
    For Row equals P down to Minimum Row+1
      Set Cow(Row) equal to Cow(Row−1)
      and set Exp(Row) equal to Exp(Row−1)
    Set Cow(Minimum Row) equal to −1 (a dummy value that cannot be assigned to a cow)
    and set Exp(Minimum Row) equal to 0
  Go back to Step 1 to test for more missing cow tags
Step 8: Store the Milking Data in the permanent Cow records Table I shows the data before Step 7. Table II shows the data after Step 7.

TABLE II

| Row | Cow | Exp | Prod | Err1 | Err2 | Sum1 | Sum2 | Total |
|---|---|---|---|---|---|---|---|---|
| 1 | 7603 | 41.0 | 46.2 | | | | | |
| 2 | 7206 | 41.0 | 41.2 | | | | | |
| 3 | 1140 | 36.0 | 37.5 | | | | | |
| 4 | 2575 | 37.0 | 43.0 | | | | | |
| 5 | 7662 | 41.0 | 47.3 | | | | | |
| 6 | −1 | 0.0 | 31.8 | | | | | |
| 7 | 3424 | 34.0 | 35.4 | | | | | |
| 8 | 7747 | 29.0 | 32.2 | | | | | |
| 9 | 1890 | 20.0 | 22.9 | | | | | |
| 10 | 6491 | 27.0 | 25.5 | | | | | |
| 11 | 6460 | 31.0 | 29.3 | | | | | |
| 12 | 7737 | 35.0 | 36.7 | | | | | |

The present method involves responding to the noted given comparative condition between milk weight values and expected milk weight values, preferably when the number of produced milk weight values exceeds the number of expected milk weight values, by: performing a first test correction by assuming a misidentified cow in a first stall number, and shifting expected milk weight values away therefrom to a further stall number, and determining a first cumulative difference between produced milk weight values and expected milk weight values; performing a second test correction by assuming a misidentified cow in a second stall number, and shifting expected milk weight values away therefrom to a further stall number, and determining a second cumulative difference between produced milk weight values and expected milk weight values; performing a third test correction by assuming a misidentified cow in a third stall number, and shifting expected milk weight values away therefrom to a further stall number, and determining a third cumulative difference between produced milk weight values and expected milk weight values; repeating the test corrections for other stall numbers, and determining respective cumulative differences for each, such that there is a first cumulative difference for the first test correction shift, a second cumulative difference for the second test correction shift, a third cumulative difference for the third test correction shift, and so on; determining the minimum value of the first, second, third and so on cumulative differences corresponding to the first, second, third and so on test correction shifts, respectively; designating the misidentified cow as the one in the stall providing the minimum cumulative difference provided by the respective test correction, whereby the remaining cows are correctly identified. When there are two missing identification tags, a first set of first, second, third and so on test corrections are performed, and a first group of one or more expected milk weight values are shifted by one stall number, and a second set of first, second, third and so on test corrections are performed, and a second group of one or more expected milk weight values are shifted by two stall numbers.

As above described, the preferred method steps involve: in a given milking, correlating identified cows to respective stall numbers and assigning expected milk values, Exp, according to stall number; determining actual produced milk weight values, Prod, according to stall number; determining if the number of actual produced milk weight values is greater than the number of expected milk weight values, and if so, then assuming there is a misidentified cow, and proceeding as follows: determining the difference, Err1, between Prod and Exp for each stall number; determining the difference, Err2, between Prod and Exp of the next stall number; determining the cumulative sum, Sum1, of Err1 values preceding each stall number; determining the cumulative sum, Sum2, of Err2 values succeeding each stall number; adding Sum1 and Sum2 to provide Total for each stall number; determining the stall number having the minimum value of Total, MinTotal, and designating the misidentified cow as the one in the stall providing MinTotal. Expected milk weight values are incremented to a higher stall number for each stall succeeding the MinTotal stall, to accurately identify succeeding cows and accurately match expected milk weight values to actual produced milk weight values.

It is recognized that various equivalents, alternatives and modifications are possible within the scope of the appended claims.

I claim:

1. In a plural stall milking parlor for milking a plurality of cows, an identification correction method comprising:
  tracking produced milk weight values of respective cows, and establishing expected milk weight values;

in a given milking, comparing said produced milk weight values and said expected milk weight values;

performing a correction by shifting at least one or more of said expected milk weight values relative to said produced milk weight values by at least one stall number to more accurately match produced milk weight values to expected milk weight values, to provide more accurate cow identification.

2. The method according to claim 1 comprising:

in said given milking, charting said produced milk weight values and said expected milk weight values in a graph of stall number versus weight;

performing said correction by shifting at least one or more of said expected milk weight values relative to said produced milk weight values along the axis of said stall number in said graph.

3. The method according to claim 1 comprising:

assuming a possible misidentified cow in a given stall number;

shifting the expected milk weight value otherwise expected for said given stall number to the next stall number;

likewise shifting the expected milk weight values for further stall numbers to the next incremented stall number, respectively.

4. The method according to claim 3 comprising:

assuming a possible second misidentified cow in a second given stall number;

shifting the shifted expected milk weight value otherwise expected for said second stall number to the next further stall number;

likewise shifting the shifted expected milk weight values for further stall numbers to the next further stall number, respectively.

5. The method according to claim 1 wherein said cows have identification tags, and comprising:

assuming a first given cow has an absent or malfunctioning identification tag;

shifting the expected milk weight value otherwise expected for the stall number of said given cow to the next stall number;

likewise shifting the expected milk weight values for further stall numbers to the next further stall number, respectively.

6. The method according to claim 5 comprising:

assuming a second given cow has an absent or malfunctioning identification tag;

shifting the shifted expected milk weight value otherwise expected for the stall number of said second given cow to the next further stall number;

likewise shifting shifted expected milk weight values for further stall numbers to the next further stall number, respectively.

7. In a milking parlor having a plurality of milking stalls for simultaneously milking a plurality of cows, and an identification station for identifying cows passing serially therethrough, an identification correction method comprising:

tracking produced milk weight values of respective cows, and establishing expected milk weight values;

in a given milking, correlating identified cows to respective stall numbers, and comparing said produced milk weight values and said expected milk weight values;

performing a correction by shifting said expected milk weight values by at least one stall number to account for an unidentified cow and properly correlate expected milk weight value to produced milk weight value and accurately identify the cow producing same.

8. The method according to claim 7 comprising correlating the produced milk weight value with the identified cow producing same, and after a plurality of milkings, establishing said expected milk weight value for the identified cow.

9. The method according to claim 7 comprising shifting some of said expected milk weight values by one stall number.

10. The method according to claim 7 comprising shifting a first group of one or more expected milk weight values by one stall number, and shifting a second group of one or more expected milk weight values by two stall numbers.

11. The method according to claim 7 comprising performing said correction in response to a given comparative condition between said produced milk weight values and said expected milk weight values.

12. In a milking parlor having a plurality of milking stalls for simultaneously milking a plurality of cows, and an identification station for identifying cows passing serially therethrough, an identification correction method comprising:

tracking produced milk weight values of respective cows, and establishing expected milk weight values;

in a given milking, correlating identified cows to respective stall numbers;

responding to a given comparative condition between produced milk weight values and expected milk weight values by:

performing a first test correction by assuming a misidentified cow in a first stall number, and shifting said expected milk weight values away therefrom to a further stall number, and determining a first cumulative difference between produced milk weight values and expected milk weight values;

performing a second test correction by assuming a misidentified cow in a second stall number, and shifting said expected milk weight values away therefrom to a further stall number, and determining a second cumulative difference between produced milk weight values and expected milk weight values;

performing a third test correction by assuming a misidentified cow in a third stall number, and shifting said expected milk weight values away therefrom to a further stall number, and determining a third cumulative difference between produced milk weight values and expected milk weight values;

repeating said test corrections for other stall numbers, and determining respective cumulative differences for each, such that there is a first cumulative difference for said first test correction shift, a second cumulative difference for said second test correction shift, a third cumulative difference for said third test correction shift, and so on;

determining the minimum value of said first, second, third and so on cumulative differences corresponding to said first, second, third and so on test correction shifts, respectively;

designating the misidentified cow as the one in the stall providing said minimum cumulative difference provided by the respective test correction, whereby the remaining cows are correctly identified.

13. The method according to claim 12 comprising:

performing a first set of said first, second, third and so on test corrections, and shifting a first group of one or more said expected milk weight values by one stall number;

performing a second set of first, second, third and so on test corrections, and shifting a second group of one or more expected milk weight values by two stall numbers.

14. The method according to claim 12 wherein said given comparative condition is an unequal number of produced milk weight values and expected milk weight values.

15. In a milking parlor having a plurality of milking stalls numbered 1 through P for simultaneously milking a plurality of cows, and an identification station for identifying cows passing serially therethrough, an identification correction method comprising:

tracking produced milk weight values of respective cows, and establishing expected milk weight values;

in a given milking, correlating identified cows to respective stall numbers and assigning expected milk weight values, Exp, according to stall number;

determining actual produced milk weight values, Prod, according to stall number;

determining if the number of actual produced milk weight values is greater than the number of expected milk weight values, and if so, then assuming there is a misidentified cow, and proceeding as follows:

determining the difference, Err1, between Prod and Exp for each stall number;

determining the difference, Err2, between Prod and Exp of the next stall number;

determining the cumulative sum, Sum1, of Err1 values preceding each stall number;

determining the cumulative sum, Sum2, of Err2 values succeeding each stall number;

adding Sum1 and Sum2 to provide Total for each stall number;

determining the stall number having the minimum value of Total, minTotal, and designating the misidentified cow as the one in the stall providing said minTotal.

16. The method according to claim 15 comprising incrementing expected milk weight values to a higher stall number for each stall succeeding said minTotal stall, to accurately identify succeeding cows and accurately match expected milk weight values to actual produced milk weight values.

17. In a plural stall milking parlor for milking a plurality of cows, an identification correction method comprising:

determining expected milk measurements based on historical milk measurements of respective cows;

for a present milking, comparing produced milk measurements and said expected milk measurements;

performing a correction by shifting at least one or more of said expected milk measurements relative to said produced milk measurements by at least one stall number to more accurately match produced milk measurements to expected milk measurements, to provide more accurate cow identification.

18. The method according to claim 17 comprising charting said produced milk measurements and said expected milk measurements in a graph of stall number versus milk measurement for said present milking, and performing said correction by shifting at least one or more of said expected milk measurements relative to said produced milk measurements along the axis of said stall number in said graph.

19. The method according to claim 17 comprising:

assuming a possible misidentified cow in a given stall number;

shifting the expected milk measurement otherwise expected for said given stall number to the next stall number;

likewise shifting the expected milk measurements for further stall numbers to the next incremented stall number, respectively.

20. The method according to claim 19 comprising:

assuming a possible second misidentified cow in a second given stall number;

shifting the shifted expected milk measurement otherwise expected for said second stall number to the next further stall number;

likewise shifting the shifted expected milk measurements for further stall numbers to the next further stall number, respectively.

21. The method according to claim 17 wherein said cows have identification tags, and comprising:

assuming a first given cow has an absent or malfunctioning identification tag;

shifting the expected milk measurement otherwise expected for the stall number of said given cow to the next stall number;

likewise shifting the expected milk measurements for further stall numbers to the next further stall number, respectively.

22. The method according to claim 21 comprising:

assuming a second given cow has an absent or malfunctioning identification tag;

shifting the shifted expected milk measurement otherwise expected for the stall number of said second given cow to the next further stall number;

likewise shifting shifted expected milk measurements for further stall numbers to the next further stall number, respectively.

23. In a milking parlor having a plurality of milking stalls for simultaneously milking a plurality of cows, and an identification station for identifying cows passing serially therethrough, an identification correction method comprising:

determining expected milk measurements based on historical milk measurements of respective cows;

for a present milking, correlating identified cows to respective stall numbers, and comparing produced milk measurements and said expected milk measurements;

performing a correction by shifting said expected milk measurements by at least one stall number to account for an unidentified cow and properly correlate expected milk measurements to produced milk measurements and accurately identify the cow producing same.

24. The method according to claim 23 comprising correlating the historical milk measurement with the identified cow producing same, and after a plurality of milkings, establishing said expected milk measurement for the identified cow.

25. The method according to claim 23 comprising shifting some of said expected milk measurements by one stall number.

26. The method according to claim 23 comprising shifting a first group of one or more expected milk measurements by one stall number, and shifting a second group of one or more expected milk measurements by two stall numbers.

27. The method according to claim 23 comprising performing said correction in response to a given comparative condition between said produced milk measurements and said expected milk measurements.

28. In a milking parlor having a plurality of stalls for simultaneously milking a plurality of cows, and an identification station for identifying cows passing serially therethrough, an identification correction method comprising:

determining expected milk measurements based on historical milk measurements of respective cows;

for a present milking, correlating identified cows to respective stall numbers;

responding to a given comparative condition between produced milk measurements and expected milk measurements by:

performing a first test correction by assuming a misidentified cow in a first stall number, and shifting said expected milk measurements away therefrom to a further stall number, and determining a first cumulative difference between produced milk measurements and expected milk measurements;

performing a second test correction by assuming a misidentified cow in a second stall number, and shifting said expected milk measurements away therefrom to a further stall number, and determining a second cumulative difference between produced milk measurements and expected milk measurements;

performing a third test correction by assuming a misidentified cow in a third stall number, and shifting said expected milk measurements away therefrom to a further stall number, and determining a third cumulative difference between produced milk measurements and expected milk measurements;

repeating said test corrections for other stall numbers, and determining respective cumulative differences for each, such that there is a first cumulative difference for said first test correction shift, a second cumulative difference for said second test correction shift, a third cumulative difference for said third test correction shift, and so on;

determining the minimum value of said first, second, third and so on cumulative differences corresponding to said first, second, third and so on test correction shifts, respectively;

designating the misidentified cow as the one in the stall providing said minimum cumulative difference provided by the respective test correction, whereby the remaining cows are correctly identified.

29. The method according to claim 28 comprising:

performing a first set of said first, second, third and so on test corrections, and shifting a first group of one or more said expected milk measurements by one stall number;

performing a second set of first, second, third and so on test corrections, and shifting a second group of one or more expected milk measurements by two stall numbers.

30. The method according to claim 28 wherein said given comparative condition is an unequal number of produced milk measurements and expected milk measurements.

31. In a milking parlor having a plurality of milking stalls numbered 1 through P for simultaneously milking a plurality of cows, and an identification station for identifying cows passing serially therethrough, an identification correction method comprising:

determining expected milk measurements based on historical milk measurements of respective cows;

for a present milking, correlating identified cows to respective stall numbers and assigning expected milk measurements, Exp, according to stall number;

determining actual produced milk measurements, Prod, according to stall number;

determining if the number of actual produced milk measurements is greater than the number of expected milk measurements, and if so, then assuming there is a misidentified cow, and proceeding as follows:

determining the difference, Err1, between Prod and Exp for each stall number;

determining the difference, Err2, between Prod and Exp of the next stall number;

determining the cumulative sum, Sum1, of Err1 values preceding each stall number;

determining the cumulative difference, Sum2, of Err2 values succeeding each stall number;

adding Sum1 and Sum2 to provide Total for each stall number;

determining the stall number having the minimum value of Total, minTotal, and designating the misidentified cow as the one in the stall providing said minTotal.

32. The method according to claim 31 comprising incrementing expected milk measurements to a higher stall number for each stall succeeding said minTotal stall, to accurately identify succeeding cows and accurately match expected milk measurements to actual produced milk measurements.

* * * * *